United States Patent
Hirabayashi et al.

(10) Patent No.: US 12,189,999 B2
(45) Date of Patent: Jan. 7, 2025

(54) IMAGE FORMING APPARATUS AND PROGRAM FOR PRINTING DATA GENERATED FOR A SHEET ONTO A LABEL

(71) Applicant: Toshiba Tec Kabushiki Kaisha, Tokyo (JP)

(72) Inventors: Kazunori Hirabayashi, Yokohama Kanagawa (JP); Yoshitaka Hashimoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/190,925

(22) Filed: Mar. 27, 2023

(65) Prior Publication Data

US 2024/0329891 A1 Oct. 3, 2024

(51) Int. Cl.
*G06F 3/12* (2006.01)
(52) U.S. Cl.
CPC .......... *G06F 3/1206* (2013.01); *G06F 3/1211* (2013.01); *G06F 3/1241* (2013.01); *G06F 3/1248* (2013.01)

(58) Field of Classification Search
CPC .... G06F 3/1206; G06F 3/1211; G06F 3/1241; G06F 3/1248
See application file for complete search history.

(56) References Cited

U.S. PATENT DOCUMENTS

| | | | |
|---|---|---|---|
| 11,042,790 B2 | 6/2021 | Saurav et al. | |
| 2018/0324323 A1* | 11/2018 | Kawara | G06F 3/1298 |
| 2019/0068808 A1* | 2/2019 | Nakamura | G06F 3/1205 |
| 2021/0182003 A1* | 6/2021 | Ban | G06F 3/1206 |

FOREIGN PATENT DOCUMENTS

| JP | 2003-054065 A | 2/2003 |
|---|---|---|
| JP | 2020-066235 A | 4/2020 |

* cited by examiner

*Primary Examiner* — Nicholas Pachol
(74) *Attorney, Agent, or Firm* — FOLEY & LARDNER LLP

(57) ABSTRACT

An image forming apparatus includes an interface, a printer, and a processor. The interface acquires first printing data. The printer prints an image on a medium. The processor extracts content blocks from the first printing data, rearranges the content blocks to generate second printing data, and controls the printer to print an image on the medium based on the second printing data.

18 Claims, 4 Drawing Sheets

IMAGE FORMING APPARATUS AND PROGRAM FOR PRINTING DATA GENERATED FOR A SHEET ONTO A LABEL

FIELD

Embodiments described herein relate generally to an image forming apparatus and a program.

BACKGROUND

There is provided a label printer (an image forming apparatus) that prints an image on a label formed in a belt shape. As such a label printer, there is a label printer that prints, using a Print Document Format (PDF) as a Page Description Language (PDL), an image on a label formed in a belt shape.

If the PDF is generated for page printers (e.g., .pdf, .docx, etc.), the label printer sometimes cannot print the PDF in a readable state because of restrictions such as the width of the label.

An object of embodiments disclosed herein is to provide an image forming apparatus and a program that can effectively print an image.

DETAILED DESCRIPTION

In general, according to one embodiment, an image forming apparatus includes an interface, a printer, and a processor. The interface acquires first printing data. The printer prints an image on a medium. The processor extracts content blocks from the first printing data, rearranges the content blocks to generate second printing data, and prints an image on the medium based on the second printing data using the printer.

The embodiment is explained below with reference to the drawings.

A label printer (an image forming apparatus) according to the embodiment prints an image using a PDF (a PDF (such as .pdf, .docx, etc.) generated for page printers) for printing an image on paper of a size such as A3 or A4. The label printer prints an image on a belt-like medium having a predetermined width. The label printer reconfigures a layout of the PDF and, thereafter, prints the image on the belt-like medium having the predetermined width.

Figure 1:
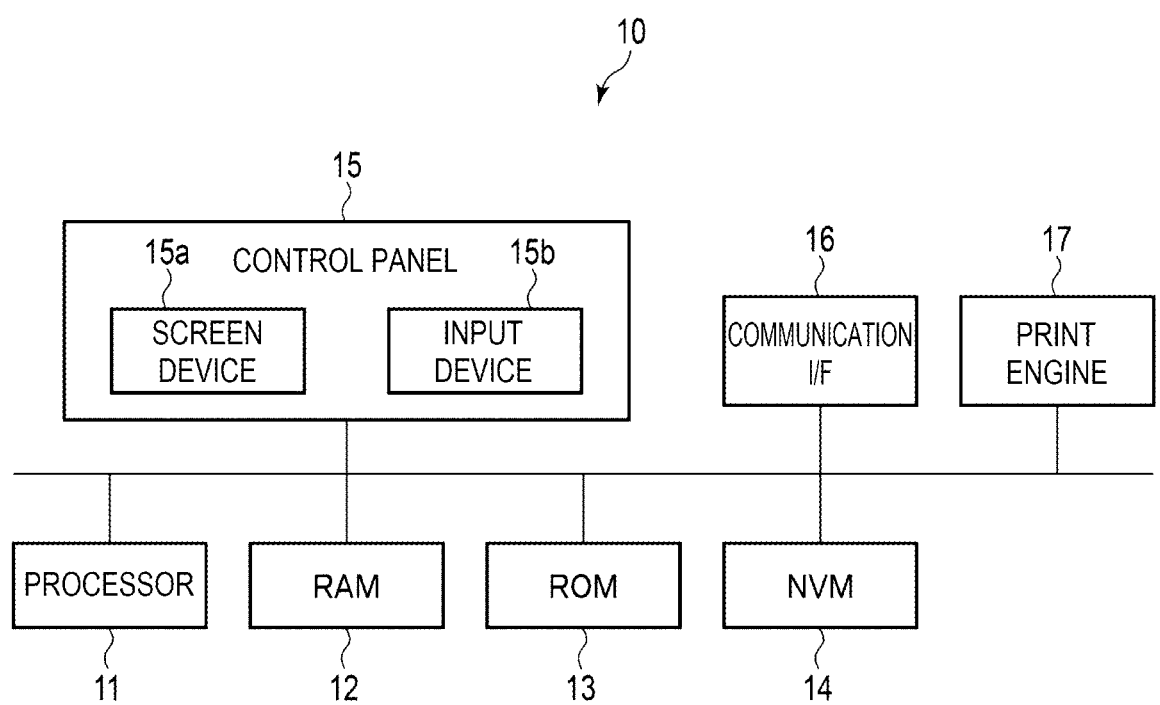
FIG. 1 is a block diagram illustrating a configuration example of an image forming apparatus according to an embodiment.

FIG. 1 illustrates a configuration example of a label printer 10 according to the embodiment. As illustrated by FIG. 1, the label printer 10 includes a processor 11, a random access memory (RAM) 12, a read-only memory (ROM) 13, a nonvolatile memory (NVM) 14, a control panel 15, a communication interface 16, and a print engine 17. The processor 11 is connected to the RAM 12, the ROM 13, the NVM 14, the control panel 15, the communication interface 16, and the print engine 17 via a data bus or the like.

The label printer 10 may further include components corresponding to necessity besides the components illustrated by FIG. 1 or specific components may be excluded from the label printer 10.

The processor 11 has a function of controlling an operation of the entire label printer 10. The processor 11 may include an internal cache and various interfaces. The processor 11 realizes various functions by executing programs stored in advance in an internal memory, the ROM 13, or the NVM 14.

A part of the various functions realized by the processor 11 executing the programs may be realized by a hardware circuit. In this case, the processor 11 controls the functions executed by the hardware circuit.

The RAM 12 is a volatile memory. The RAM 12 temporarily stores, for example, data being processed by the processor 11. The RAM 12 stores various application programs based on an instruction of the processor 11. The RAM 12 may store data necessary for execution of the application programs, execution results of the application programs, and the like.

The ROM 13 is a nonvolatile memory in which control programs, control data, and the like are stored in advance. The control programs and the control data stored in the ROM 13 are incorporated in advance according to the specifications of the label printer 10.

The NVM 14 is a data writable and rewritable nonvolatile memory. The NVM 14 is configured from, for example, a Hard Disk Drive (HHD), a Solid State Drive (SSD), or a flash memory. The NVM 14 stores control programs, applications, various data, and the like according to operation uses of the label printer 10.

Various instructions are input to the control panel 15 from an operator of the label printer 10. The control panel 15 displays various kinds of information to the operator of the label printer 10.

The control panel 15 is configured from or includes a screen device 15a (a display, a touch display, etc.), an input device 15b, and the like.

The screen device 15a displays information based on control of the processor 11. For example, the screen device 15a is configured from a liquid crystal monitor.

Various kinds of operations are input to the input device 15b from the operator. The input device 15b transmits a signal indicating the input operation to the processor 11. The input device 15b is configured from a touch panel or the like. The input device 15b functioning as the touch panel may be configured integrally with the screen device 15a.

The communication interface 16 is an interface for connection to an external apparatus. The communication interface 16 transmits and receives data to and from the external apparatus via a predetermined network. For example, the communication interface 16 supports wired or wireless LAN (Local Area Network) connection.

The print engine 17 (a printer) prints printing data on a label (paper) based on the control of the processor 11.

The label is a belt-like medium having a predetermined width. For example, the label is stored in the print engine 17 in a state in which the label is wound in a roll shape. The label may be a sticker.

The print engine 17 draws out, according to the control of the processor 11, a leading end from the label wound in the roll shape. The print engine 17 prints an image from the leading end toward the trailing end of the drawn-out label. The print engine 17 prints the image on the label while drawing out the label. That is, the print engine 17 prints the image on the label variable in a direction in which the belt extends.

For example, the print engine 17 prints image data on paper using an electrophotographic system. The print engine 17 is configured from or includes a transfer body, a photoconductive drum that transfers a toner image onto the transfer body, a transfer roller that transfers the toner image from the transfer body onto the paper, a heater that heats the paper on which the toner image is transferred, and the like.

The print engine 17 may print image data on paper using an inkjet system.

The label may be heat sensitive paper. In this case, the print engine 17 heats the label and prints an image on the label.

A printing method of the print engine 17 is not limited to a specific configuration.

The print engine 17 may include a cutter that cuts a printed label. For example, if printing is completed, the print engine 17 cuts the label at the trailing end of an image using the cutter. The print engine 17 may have structure in which the operator pulls the label, whereby the label is cut by the cutter.

Subsequently, functions realized by the label printer 10 are explained. The functions realized by the label printer 10 are realized by the processor 11 executing programs stored in the internal memory, the ROM 13, the NVM 14, or the like.

First, the processor 11 has a function of acquiring a PDF (an original PDF or first printing data) generated for page printers.

For example, the processor 11 acquires the original PDF from an external apparatus such as a PC through the communication interface 16.

The original PDF is configured in a layout for printing an image on paper of a size such as A3 or A4.

The processor 11 has a function of extracting content blocks from the original PDF.

The content blocks are collections of contents having independency. For example, the content blocks are sections, images, sentence blocks, or the like.

For example, the processor 11 extracts the content blocks based on subsets embedded in the original PDF. In this case, the processor 11 extracts collections of sentences as the content blocks.

The processor 11 may extract the content blocks with an image analysis. For example, the processor 11 extracts, as the content blocks, regions where one image is displayed in the original PDF. The processor 11 may extract, as the content blocks, regions where label data for label printing is displayed.

The processor 11 may recognize text with Optical Character Recognition (OCR). The processor 11 may extract the content blocks based on the recognized text.

The processor 11 may specify order of the content blocks. For example, the processor 11 specifies the order of the content blocks based on a direction (lateral writing or longitudinal writing) of sentences in the content blocks, the positions of the content blocks, and the like.

The processor 11 has a function of rearranging the content blocks to generate a PDF for label print (a label layout PDF or second printing data).

Figure 2:
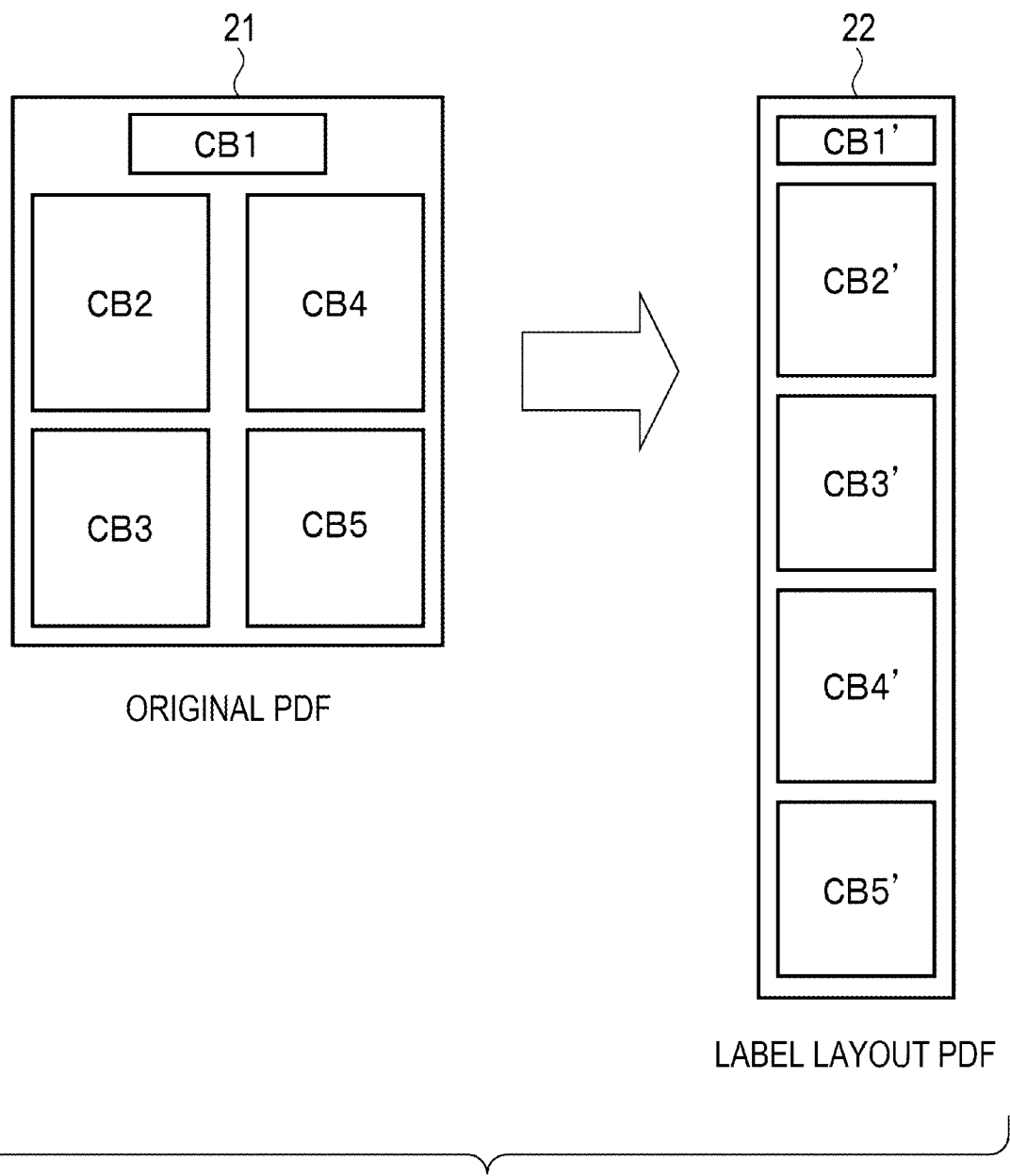
FIG. 2 is a diagram illustrating an operation example of the image forming apparatus.

FIG. 2 illustrates an operation example in which the processor 11 generates a label layout PDF 22 from an original PDF 21. In the example illustrated by FIG. 2, it is assumed that the processor 11 extracts content blocks 1 to 5 from the original PDF 21.

After extracting the content blocks 1 to 5, the processor 11 specifies or determines an order of the content blocks 1 to 5. It is assumed that the content blocks 1 to 5 are laterally written. Since the content blocks 1 to 5 are laterally written, the processor 11 specifies the order in the order of upper left, lower left, upper right, and lower right. The processor 11 specifies a beginning content block 1 as a head content block. That is, the processor 11 determines the order in the order of the content blocks 1 to 5.

After specifying the order, the processor 11 determines a direction of the content blocks 1 to 5 in the label layout PDF 22. For example, the processor 11 determines the direction based on an aspect ratio of the content blocks 1 to 5. The processor 11 determines the direction of the content blocks 1 to 5 in the label layout PDF 22 such that the longitudinal direction of the majority of the content blocks 1 to 5 and the direction in which the label extends coincide. It is assumed that directions of the content blocks 1 to 5 in the label layout PDF 22 are the same.

Here, since the majority of the content blocks 1 to 5 are longitudinally long, the processor 11 determines that the direction of the content blocks 1 to 5 in the label layout PDF 22 is the longitudinal direction.

After determining the direction, the processor 11 acquires label size information indicating the lateral width of the label. For example, the NVM 14 stores the label size information in advance. The processor 11 acquires the label size information from the NVM 14. The label size information may be updated as appropriate according to the label.

After acquiring the label size information, the processor 11 enlarges or reduces the content blocks 1 to 5 based on the label size information. For example, the processor 11 enlarges or reduces the content blocks 1 to 5 such that the lateral width of the label and the lateral width of the content blocks 1 to 5 correspond. The enlarged or reduced content blocks 1 to 5 are herein respectively referred to as content blocks 1' to 5'.

After generating the content blocks 1' to 5', the processor 11 arranges the content blocks 1' to 5' in a row in order according to the specified order to generate the label layout PDF 22. That is, the processor 11 arranges the content blocks 1' to 5' in a row in the longitudinal direction of the label (the direction in which the belt extends).

Subsequently, another operation example in which the processor 11 generates a label layout PDF is explained.

Figure 3:
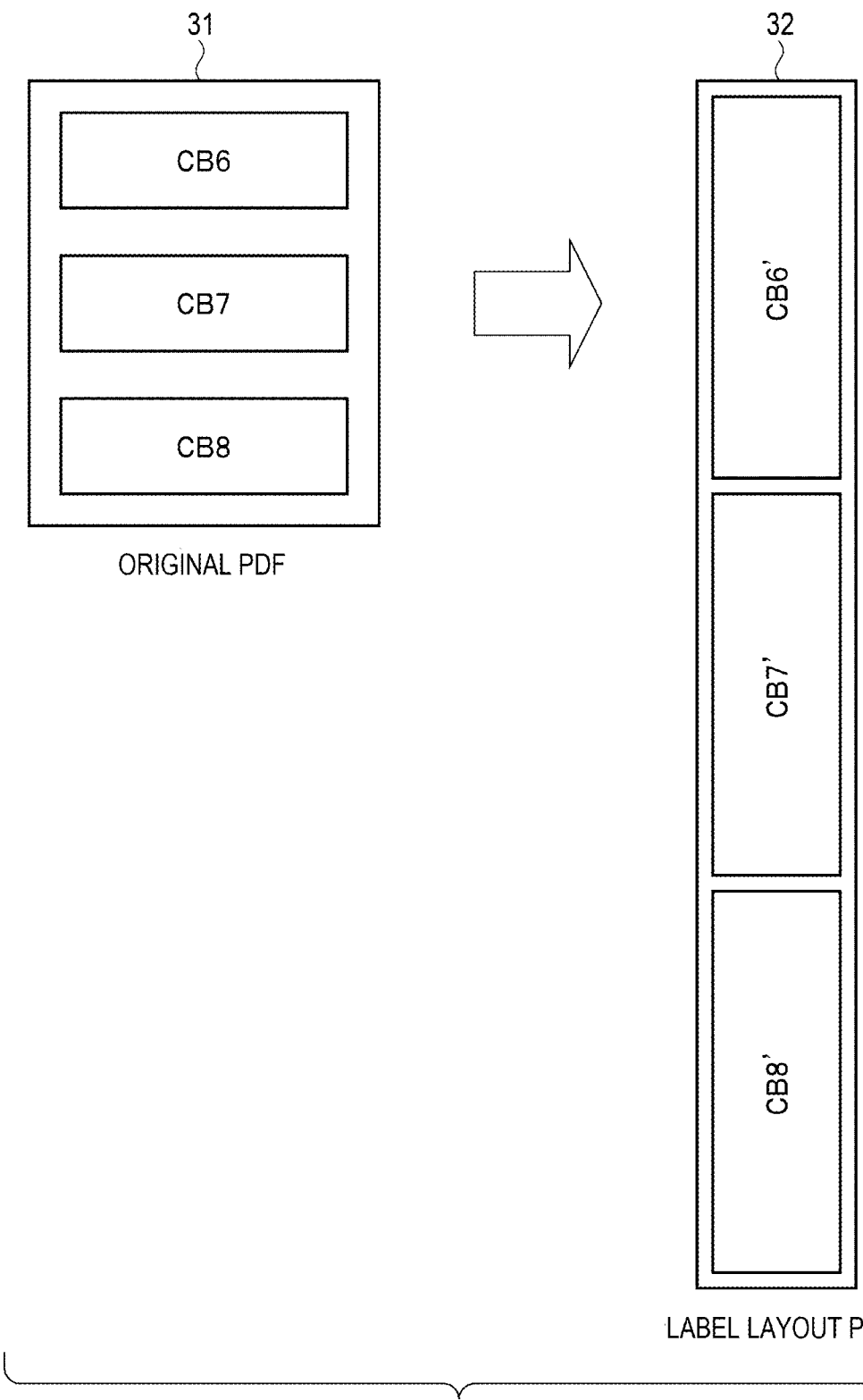
FIG. 3 is a diagram illustrating an operation example of the image forming apparatus.

FIG. 3 illustrates another operation example in which the processor 11 generates a label layout PDF. In FIG. 3, the processor 11 generates a label layout PDF 32 from an original PDF 31.

Here, it is assumed that the original PDF 31 is configured from three label data. It is assumed that the processor 11 extracts content blocks 6 to 8 (label data) from the original PDF 31.

After extracting the content blocks 6 to 8, the processor 11 specifies or determines an order of the content blocks 6 to 8. The processor 11 specifies the order in order from the top to the bottom. That is, the processor 11 specifies the order in the order of the content blocks 6 to 8.

After specifying the order, the processor 11 determines a direction of the content blocks 6 to 8 in the label layout PDF 32.

Here, since the majority of the content blocks 6 to 8 are laterally long, the processor 11 determines that the direction of the content blocks 6 to 8 in the label layout PDF 32 is lateral.

After determining the direction, the processor 11 acquires label size information indicating the lateral width of the label.

After acquiring the label size information, the processor 11 enlarges or reduces the content blocks 6 to 8 based on the label size information. For example, the processor 11 enlarges or reduces the content blocks 6 to 8 such that the lateral width of the label and the height of the content blocks 6 to 8 correspond. The enlarged or reduced content blocks 6 to 8 are hereinafter respectively referred to as content blocks 6' to 8'.

After generating the content blocks 6' to 8', the processor 11 arranges the content blocks 6' to 8' in a row in order according to the specified order to generate the label layout PDF 32.

The processor 11 has a function of printing a label layout PDF using the print engine 17.

After generating the label layout PDF, the processor 11 prints the label layout PDF using the print engine 17. For example, the processor 11 draws out a roll-like label using the print engine 17. After drawing out the label, the processor 11 prints an image from the leading end toward the trailing end of the label based on the label layout PDF using the print engine 17. After printing the image, the processor 11 discharges the label on which the image is printed using the print engine 17.

Subsequently, an operation example of the label printer 10 is explained.

Figure 4:
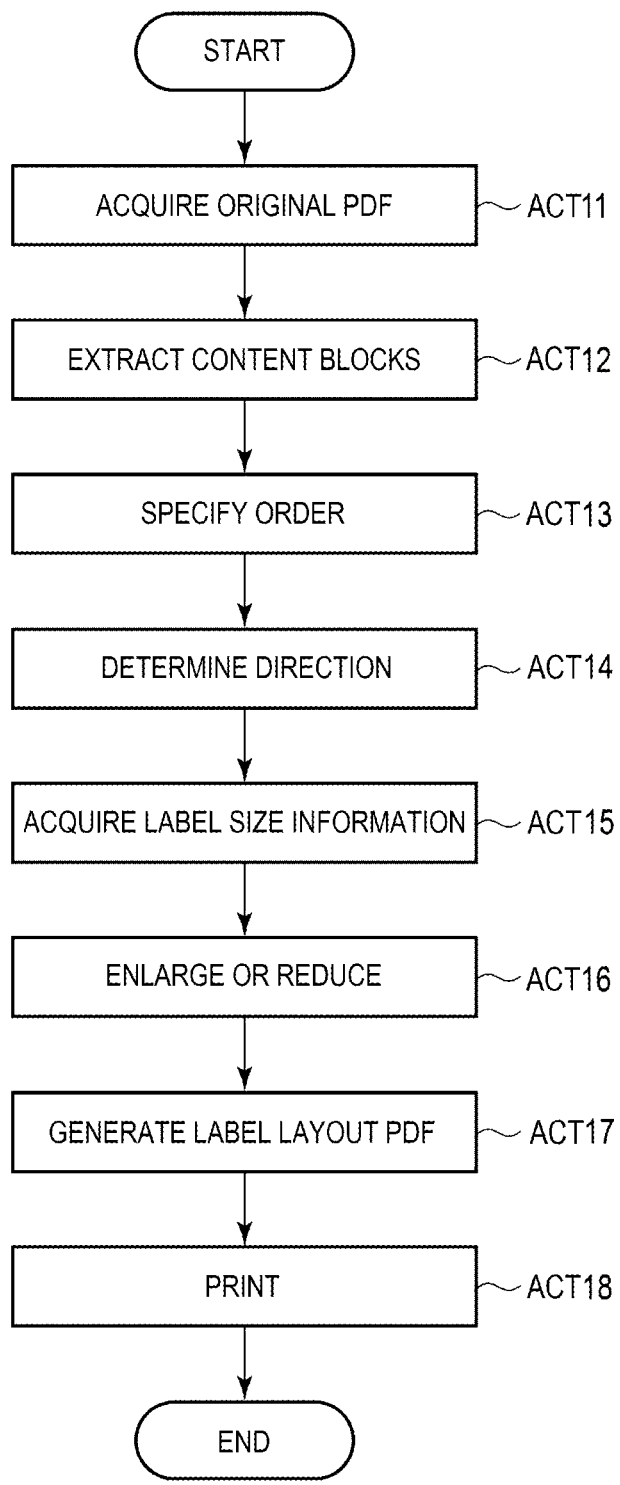
FIG. 4 is a flowchart illustrating an operation example of the image forming apparatus.

FIG. 4 is a flowchart for explaining the operation example of the label printer 10.

First, the processor 11 of the label printer 10 acquires an original PDF through the communication interface 16 (Act 11). After acquiring the original PDF, the processor 11 extracts content blocks from the original PDF (Act 12).

After extracting the content blocks, the processor 11 specifies or determines an order of the content blocks (Act 13). After specifying the order of the content blocks, the processor 11 determines a direction of the content blocks in a label layout PDF (Act 14).

After determining the direction of the content blocks, the processor 11 acquires label size information (Act 15). After acquiring the label size information, the processor 11 enlarges or reduces the content blocks based on the label size information (Act 16).

After enlarging or reducing the content blocks, the processor 11 arranges the enlarged or reduced content blocks according to the specified order to generate the label layout PDF (Act 17).

After generating the label layout PDF, the processor 11 prints an image on a label based on the generated label layout PDF using the print engine 17 (Act 18).

After printing the image on the label, the processor 11 ends the operation.

The order of Act 13, Act 14, Act 15, and/or Act 16 may be different.

The label may not have the belt shape. The label may be a label cut into a predetermined shape.

The processor 11 may arrange content blocks in two or more rows to generate a label layout PDF. The processor 11 may determine the number of rows of the content blocks in the label layout PDF according to the width of a label.

The label printer configured as explained above extracts content blocks from a PDF generated for page printers. The label printer rearranges the extracted content blocks to generate a PDF for label printers. The label printer prints an image on a label based on the generated PDF. As a result, the label printer can appropriately print, on the label, the content blocks included in the PDF generated for page printers. Accordingly, the label printer can effectively print, on the label, the PDF generated for page printers.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
    an interface configured to acquire first printing data generated for printing on a first medium having a first size with set dimensions;
    a printer configured to print an image on a second medium having a second size different than the first size, a dimension of the second size being variable in a predetermined direction; and
    a processor configured to:
        extract content blocks from the first printing data;
        rearrange the content blocks to generate second printing data for printing on the second medium rather than the first medium, which includes determining a direction of the content blocks in the second printing data relative to the predetermined direction based on an aspect ratio of the content blocks; and
        control the printer to print an image on the second medium based on the second printing data.

2. The apparatus according to claim 1, wherein the dimension in the predetermined direction varies based on the content blocks extracted from the first printing data.

3. The apparatus according to claim 2, wherein the processor is configured to arrange the content blocks in the predetermined direction to generate the second printing data.

4. The apparatus according to claim 3, wherein the processor is configured to:
    determine an order of the content blocks; and
    arrange the content blocks in the predetermined direction according to the order to generate the second printing data.

5. The apparatus according to claim 2, wherein the processor is configured to:
    enlarge or reduce a size of the content blocks based on a width of the second medium; and
    arrange the content blocks that have been enlarged or reduced to generate the second printing data.

6. The apparatus according to claim 1, wherein the processor is configured to determine the direction of the content blocks in the second printing data such that a longitudinal direction of the content blocks and the predetermined direction coincide.

7. The apparatus according to claim 1, wherein the first printing data is a print document format generated for page printers.

8. The apparatus according to claim 7, wherein the processor extracts the content blocks based on subsets embedded in the print document format.

9. The apparatus according to claim 1, wherein a width dimension of the second medium is less than a width dimension of the first medium, wherein the first medium is a sheet of paper and the first size is a standardized paper size, and wherein the second medium is a label and the second size varies based on a length in the predetermined direction sized to fit the content blocks on the label.

10. The apparatus according to claim 1, wherein the processor is configured to utilize Optical Character Recognition to facilitate extracting the content blocks from the first printing data.

11. An image forming method comprising:
    acquiring, by a processor, first printing data generated for printing on a first medium having a first size with set dimensions;
    extracting, by the processor, content blocks from the first printing data;
    rearranging, by the processor, the content blocks to generate second printing data for printing on a second medium having a second size different than the first size, which includes determining a direction of the content blocks in the second printing data relative to a predetermined direction of the second medium based on an aspect ratio of the content blocks, a dimension of the second size being variable in the predetermined direction; and
    controlling, by the processor, a printer to print an image on the second medium based on the second printing data.

12. The image forming method according to claim 11, wherein the dimension in the predetermined direction varies based on the content blocks extracted from the first printing data.

13. The image forming method according to claim 12, further comprising arranging, by the processor, the content blocks in the predetermined direction to generate the second printing data.

14. The image forming method according to claim 13, further comprising:
    determining, by the processor, an order of the content blocks; and
    arranging, by the processor, the content blocks in the predetermined direction according to the order to generate the second printing data.

15. The image forming method according to claim 12, further comprising:
    enlarging or reducing, by the processor, a size of the content blocks based on a width of the second medium; and
    arranging, by the processor, the content blocks that have been enlarged or reduced to generate the second printing data.

16. The image forming method according to claim 11, further comprising determining, by the processor, the direction of the content blocks in the second printing data such that a longitudinal direction of the content blocks and the predetermined direction coincide.

17. The image forming method according to claim 11, wherein the first printing data is a print document format.

18. The image forming method according to claim 17, further comprising extracting, by the processor, the content blocks based on subsets embedded in the print document format.

* * * * *